United States Patent

[11] 3,617,251

[72] Inventors Don L. Hunter
  Anaheim;
  William G. Woods, Fullerton; James D. Stone, Whittier; Cecil W. LeFevre, Anaheim, all of Calif.
[21] Appl. No. 875,507
[22] Filed Nov. 10, 1969
[45] Patented Nov. 2, 1971
[73] Assignee United States Borax & Chemical Corporation
  Los Angeles, Calif.

[54] HERBICIDAL HALODINITRO-1,3-PHENYLENEDIAMINE COMPOUNDS
16 Claims, No Drawings

[52] U.S. Cl................................................ 71/121,
  71/88, 71/92, 71/94, 71/95, 71/DIG. 1, 260/239,
  260/247.5, 260/268, 260/293, 260/326.85,
  260/577
[51] Int. Cl.................................................. A01n 9/20
[50] Field of Search........................................ 71/121, 95,
  88, 94, 92

[56] References Cited
UNITED STATES PATENTS
3,442,639  5/1969  Soper........................... 71/121
3,466,329  9/1969  Soper........................... 71/121 X Primary Examiner—James O. Thomas, Jr.
Attorney—James R. Thornton ABSTRACT: 2,4-Dinitro-6-halo-1,3-phenylenediamine compounds having at least one N-substituent are useful as herbicides.

HERBICIDAL HALODINITRO-1,3-PHENYLENEDIAMINE COMPOUNDS

This invention relates to 6-halo-2,4-dinitro-1,3-phenylenediamine compounds and their use as herbicides. There is provided by this invention a class of 2,4-dinitro-N-substituted-1,3-phenylenediamine compounds having a halo substituent in the six position of the aromatic ring and having outstanding herbicidal activity.

The herbicides of this invention can be defined by the formula

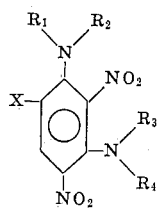

wherein X is halogen, such as chloro, bromo, iodo and fluoro, and $R_1$, $R_2$ $R_3$ and $R_4$ are each selected from hydrogen, alkyl, alkenyl and alkynyl, with the proviso that at least one of said R's is a hydrocarbon group. Also, $R_1$–$R_2$ and/or $R_3$–$R_4$ can represent a portion of a cyclic group such as an alkylene chain to form a heterocyclic group containing carbon atoms in addition to the nitrogen atom which is the point of attachment to the aromatic ring.

For convenience in naming the compounds, the amino nitrogen adjacent to the halo group is referred to as $N^1$ and the amino nitrogen between the nitro groups on the ring is referred to as $N^3$. Thus, the nitro substituents are in the two and four position of the aromatic ring and the halo group is in the six position of the aromatic ring. It will be noted from the above definition that either the $N^1$ or the $N^3$ amino nitrogen must have at least one hydrocarbon substituent thereon, thereby excluding the compounds having two unsubstituted amino (—$NH_2$) groups.

Typical examples of hydrocarbon groups represented by $R_1$, $R_2$, $R_3$, and $R_4$ as defined above are the lower alkyl, lower alkenyl, and lower alkynyl groups having up to about six carbon atoms, including the cyclic analogues thereof as well as the halo, hydroxy, and lower alkoxy substituted derivatives thereof. Representative groups are methyl, ethyl, n-propyl, isopropyl, n-butyl, sec butyl, n-pentyl, sec-pentyl, n-hexyl, allyl, 2-butenyl, 2-butynyl, 3-butynyl, methallyl, 2-pentynyl, 2-hydroxyethyl, 4-hydroxy-2-butynyl, 2-methoxyethyl, 3-ethoxypropyl, 2-chloroallyl, 2-bromoallyl, 2-bromoethyl, 1-methyl-2-methoxyethyl, propynyl, 4-chloro-2-butenyl, 4-bromo-1-butenyl, 3-iodo-2-pentenyl, 4-chloro- 2-butynyl, cyclohexyl, cyclopropyl, cyclobutyl, cyclohexenyl, and the like.

Furthermore, $R_1$–$R_2$ and/or $R_3$–$R_4$ can represent a fragment of a ring of which the amino nitrogen is a part thereof, such as illustrated by the structure

in which Z is an alkylene group having from about two to six carbon atoms in the chain, and optionally other atoms such as oxygen and nitrogen. Examples of linkages are the dimethylene, trimethylene, tetramethylene, diethyleneoxy, diethyleneimino, and hexamethylene groups.

A preferred class of compounds according to this invention are those in which X is bromo or chloro, $R_1$ is hydrogen, $R_2$ is selected from hydrogen and alkyl of one to three carbon atoms and $R_3$ and $R_4$ are each selected from hydrogen and alkyl of one to five carbon atoms. Preferably, the compounds are unsymmetrical; that is,

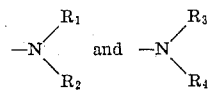

are different, and the total number of carbon atoms represented by $R_3$+$R_4$ is about two to eight.

Representative examples of such preferred compounds are
$N^1$-ethyl-$N^3$$N^3$-diethyl-2,4-dinitro-6-bromo-1,3-phenylenediamine
$N^1$-methyl-$N^3$-sec-butyl-2,4-dinitro-6-chloro-1,3-phenylenediamine
$N^1$-ethyl-$N^3$-sec-butyl-2,4-dinitro-6-bromo- 1,3-phenylenediamine
$N^1$-methyl-$N^3$, $N^3$-di-n-propyl-2,4-dinitro-6-chloro-1,3-phenylenediamine
$N^3$,$N^3$-di-n-propyl-2,4-dinitro-6-chloro-1,3-phenylenediamine
$N^1$-methyl-$N^3$,$N^3$-diethyl-2,4-dinitro-6-chloro-1,3-phenylenediamine
$N^3$,$N^3$-diethyl-2,4-dinitro-6-bromo-1,3-phenylenediamine
$N^1$-sec-pentyl-$N^3$,$N^3$-dimethyl-2,4 -dinitro-6-chloro 1,3-phenylenediamine A particularly preferred class of compounds can be illustrated by the formula

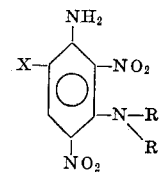

in which X is bromo or chloro and each R is selected from hydrogen and alkyl of one to five carbon atoms, the total number of carbon atoms represented by R+R being three to eight.

The compounds of this invention are either crystalline solids or high-boiling liquids. Generally they are only slightly soluble in water and are moderately soluble in the usual organic solvents such as ethanol, acetone, ether and benzene. The compounds are readily prepared by reaction of one or two amines or ammonia with a 1,24-trihalo3,5-dimitrobenzene according to the following equation:

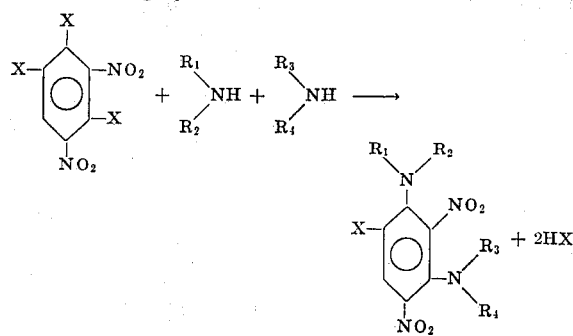

in which X is halogen and $R_1$, $R_2$, $R_3$ and $R_4$ have the significance previously assigned.

When $R_1$ and $R_2$ are the same as $R_3$ and $R_4$, that is when the substituted $N^1$ amino group is the same as the substituted $N^3$ amino group in the resultant product, the reaction takes place in one step using at least 2 moles of amine for each mole of 1,2,4-trihalo-3,5-dinitrobenzene. The hydrogen halide can be neutralized by excess amine or a tertiary amine. When $R_1$ and $R_2$ are different from $R_3$ and $R_4$, the reaction requires two steps in which a different amine (or ammonia) is employed in each step. In the first step about 2 moles of the amine forming the $N^3$ group is reacted with about 1 mole of the 1,2,4-trihalo-3,5-dinitrobenzene. The first halogen atom replaced is that between the nitro groups on the aromatic ring. This step is advantageously carried out in a nonpolar solvent such as a hydrocarbon in which the amine hydrohalide is insoluble and can be removed by filtration. In the second step about 2 moles of the amine forming the $N^1$ group is reacted with the monoamino-substituted compound to form the unsymmetrically substituted 1,3-phenylenediamine compound. The second reaction can take place in a sealed reaction vessel, such as a sealed tube or an autoclave, to avoid losses of amine and provide easy control of the reaction, or at atmospheric pressure in the presence of a solvent, such as an alcohol, in which the amine is highly soluble. In the case of higher boiling amines it is not necessary to use a sealed reaction vessel for the reaction but it is sufficient merely to carry it out in the presence of a suitable solvent.

A reaction temperature in the range of from about 20° to about 120° C. preferably is employed to give good yields of the desired product and a satisfactory rate of reaction, both in the case of using a sealed reaction vessel and when the reactants are brought together at atmospheric pressure. Hydrogen halide is formed as a byproduct and, in the presence of excess amine, is converted to the amine hydrohalide which can be readily removed by washing with water or by filtration after dissolution of the product in a suitable solvent. The desired products can be purified by well-known procedures such as by recrystallization.

The following examples describe preparation of representative compounds of this invention but it is to be understood that the invention is not to be limited to the specific examples given.

EXAMPLE I

N-(3-pentyl)-3,4-dichloro-2,6-dinitroaniline

3-Pentylamine (6.00 g.; 0.0688 mole) was added to a stirred solution of 1,2,4,-trichloro-3,5-dinitrobenzene (9.338 g.; 0.0344 mole) in 200 ml. of cyclohexane over a 15-minute period. After stirring at room temperature for 1 hour, the reaction mixture was heated to reflux temperature for 17 hours and ten evaporated to dryness under reduced pressure. The residue was extracted with 250 ml. of boiling cyclohexane which was decanted and stripped. This residue was then taken up in chloroform, extracted with 3N hydrochloric acid, then water, dried over sodium sulfate, filtered, and the chloroform removed by distillation. The residual oil was taken up in 25 ml. of n-hexane, cooled and filtered to give 0.5 g. of unreacted starting material. The filtrate was stripped leaving 9.24 g. (83.3 percent) of N-(3-pentyl)-3,4-dichloro-2,6-dinitroaniline as an oil which was identified by its nuclear magnetic resonance spectrum.

$N^3$-(3-pentyl)-6-chloro-2,4-dinitro-1,3-phenylenediamine

A mixture of 5.00 g. (0.0155 mole) of N-(3-pentyl)-3,4-dichloro-2,6-dinitroaniline and 6.89 g. (0.0310 mole) of a 7.66 percent solution of ammonia in absolute ethanol was sealed in a tube with about 30 ml. of absolute ethanol. After heating for 72 hours at 94° C., the reaction mixture was stripped and the residue triturated with 500 ml. of water. Filtration and crystallization of the solid from ethanol gave 1.89 g. (40 percent) of crude product, m.p. 118.5°–121.5° C. This was taken up in 60 ml. of hot cyclohexane, filtered, stripped, and the residue recrystallized from 95 percent ethanol to give the desired product as shiny, orange rectangles, m.p. 119.3°–120.6° C.

EXAMPLE II $N^3$, $N^3$-diethyl-6-chloro-2,4-dinitro-1,3-phenylenediamine

This compound was prepared in a similar manner by reaction of N,N-diethyl-3,4-dichloro-2,6-dinitroaniline with ammonia. The crystalline product melts at 110°–111° C.

EXAMPLE III $N^3$, $N^3$-di-n-propyl-6-bromo-2,4-dinitro-1,3-phenylenediamine This compound was prepared in a similar manner by reaction of N,N-di-n-propyl-3,4-dibromo-2,6-dinitroaniline with ammonia. The crystalline product melts at 119°–120° C.

EXAMPLE IV

N, N,N-di-n-propyl-3-chloro-2,6-dinitro-4-fluoroaniline

A mixture of 8.0 g. (0.0314 mole) of 2,4-dichloro-3,5-dinitrofluorobenzene, 6.35 g. (0.0628 mole) of di-n-propylamine, and 75 ml. of cyclohexane was heated at 58°–72° C. for 15.5 hours. The di-n- hydrochloride was removed by filtration and the solvent evaporated from the filtrate leaving an oil. The oil was taken up in cold pentane, filtered, and evaporated at reduced pressure leaving 10.03 g. (96.5 percent) of N,N-di-n-propyl-3-chloro- 2,6-dinitro-4-fluoroaniline, identified by its nuclear magnetic resonance spectrum.

$N^3$, $N^3$-di-n-propyl-2,4-dinitro-6-fluoro-1,3-phenylenediamine

A solution of 7.34 g. (0.0224 mole) of N,N-di-n-propyl3-chloro2,6-dinitro-4-fluoroaniline, 12.87 g. (0.0458 mole) of 6.06 percent solution of ammonia in absolute ethanol, and 2.317 g. (0.0229 mole) of triethylamine in about 35 ml. of absolute ethanol was heated in a sealed Pyrex tube for 72 hours at 98° C. The contents were distilled to dryness at reduced pressure and extracted twice with 100 ml. portions of boiling cyclohexane. The combined filtered cyclohexane extracts were evaporated to dryness and the residual oil taken up in hot n-hexane, filtered, and evaporated to an oil. This crude oil was chromatographed over 250 g. of activated alumina using pentane, 2:1 pentane-benzene and 1:2 pentane-benzene, respectively, as eluting solvents. After an initial fraction of $N^1,N^1$, $N^3$, $N^3$-tetra-n-propyl-,4-dinitro-6-fluoro-1,3-phenylenediamine was collected, $N^3$ , $N^3$ -di-n-propyl-2,4-dinitro- 6-fluoro-1,3-phenylenediamine was obtained. Recrystallization twice from aqueous ethanol gave the product as orange needles, m.p. 90.5°–91.5° C.

EXAMPLE V $N^1$, $N^3$-diethyl-6-chloro-2,4-dinitro-1,3-phenylenediamine

To a stirred solution of 20 ml. of 70 percent aqueous ethylamine in 50 ml. of ethanol was added, dropwise at room temperature, a solution of 6.79 g. (0.025 mole) of 1,2,4-trichloro-3,5-dinitrobenzene dissolved in 200 ml. of ethanol. An additional 20 ml. of 70 percent aqueous ethylamine was then added to the stirred mixture. The resultant solution was refluxed for 1 hour and then stirred at room temperature overnight. The mixture was cooled in an ice water bath and then filtered to obtain 5.70 g. of the desired product as an orange solid, m.p. 96.5°–98° C. After recrystallization from ethanol, the compound melts at 97.5°–98.5° C.

The following are among the many other compounds according to this invention which can be prepared by the above-described procedures.

$N^3$-sec-butyl-2,4-dinitro-5-chloro-1,3-phenylenediamine; m.p. 124.5°–125.5° C.

$N^3$sec-butyl-2,4-dinitro-6-bromo-1,3-phenylenediamine; m.p. 140.5°–141.5° C.

$N^3$, $N^3$ -diethyl-2,4-dinitro-6-bromo-1,3-phenylenediamine, m.p. 107°–109° C.

$N^3$(1-methyl-2-methoxyethyl)-2,4-dinitro-6-chloro-1,3-phenylenediamine 148°–150° C.

$N^3$-sec-amyl-2,4-dinitro-6-bromo-1,3-phenylenediamine; m.p. 115°–116.5° C.

$N^3$-(1-methyl-2-methoxyethyl)-2,4-dinitro-6-chloro-1,3-pheylenediamine; m.p. 138.5°–141° C.

$N^1$, $N^3$-bis(2-chloroallyl)-2,4-dinitro-6-chloro-1,3-phenylenediamine; m.p. 99.5°–100.5° C.

$N^1$, $N^3$-dicyclopropyl-2,4-dinitro-6-chloro-1,3-phenylenediamine; m.p. 112°–113° C.

$N^1$, $N^3$-diallyl-2,4-dinitro-6-bromo-1,3-phenylenediamine; m.p. 82.5°–83.5° C.

$N^1$, $N^1$-dimethyl-$N^3$, $N^3$-diethyl-2,4-dinitro-6-chloro-1,3-phenylenediamine; m.p. 67–68° C.

$N^1$-ethyl-$N^3$-sec-butyl-2,4-dinitro-6-chloro-1,3-phenylenediamine; m.p. 72.5°–74° C.

$N^3$, $N^3$-pentamethylene-2,4-dinitro-6-chloro-1,3-phenylenediamine; m.p. 123.5°–124.5° C.

$N^1$, $N^1$, $N^3,N^3$-tetra-n-propyl-2,4-chloro-6-fluoro-1,3-phenylenediamine; oil $N^1$-methyl-$N^3$-sec-butyl-2,4-dinitro-6-chloro-1,3-phenylenediamine; m.p. 105°–108° C.

$N^3$, $N^3$-di-n-propyl-2,4-dinitro-6-chloro-1,3-phenylenediamine; m.p. 122.5°–123.5° C.

$N^1$, $N^1$-dimethyl-$N^3$, $N^3$-dimethyl-2,4-dinitro-6-chloro-1,3-phenylenediamine; m.p. 77°–78° C.

$N^1$, $N^3$-diethyl-2,4-dinitro-6-fluoro-1,3-phenylenediamine; m.p. 146°–147.5° C.

$N^1$-methyl-$N^3$, $N^3$-di-n-propyl-2,4-dinitro-6-chloro-1,3-phenylenediamine; oil $N^1$-methyl-$N^3$, $N^3$-diethyl-2,4-dinitro-6-chloro-1,3-phenylenediamine; m.p. 82.5°–83.5° C.

$N^3$, $N^3$-dimethyl-2,4-dinitro-6-bromo-1,3-phenylenediamine; m.p. 143°–143.5° C.

$N^1$, $N^3$-dicyclohexyl-2,4-dinitro-6-bromo-1,3-phenylenediamine; m.p. 113°–114° C.

The compounds of this invention are excellent herbicides and are especially useful as selective herbicides for controlling weeds in the presence of desirable crops, especially the grassy weeds such as for example, foxtail, water grass, wild oats, and crabgrass.

The compounds can be applied as both a preemergence or a postemergence treatment; that is they can be applied to soil in which the weeds will grow or they can be used to kill or suppress the growth of weeds or to kill or prevent the emergence of seedlings of undesirable plants. Thus, the compounds can be used to control the growth of weeds by applying a phytotoxic amount of one or more of the active compounds of this invention to the locus to be protected, that is, soil in which the weeds are growing or will grow or the foliage of the growing plants. "Weeds" as used herein is meant to include any plant growth which is undesirable.

Generally an application rate of from about 0.1 to about 25 pounds of one or more of the active compounds per acre is effective in controlling plant growth. Preferably an application rate of from about 0.5 to about 5 pounds per acre is employed. At such rates the undesirable weeds are killed or stunted with little or no injury to desirable crops.

The following examples illustrate the herbicidal activity of typical compounds of this invention.

EXAMPLE VI

Greenhouse flats were planted to soybeans, velvetleaf, oats, and millet. On the same day as planting the flats were sprayed with an ethanol solution of the compound to be tested at a rate of 5 pounds per acre. The flats were kept in the greenhouse and watered when needed. Twenty-one days after treatment the flats were examined and the plants rated for herbicidal activity and rated on a 0 to 9 scale in which 0 = no effect; 5 = substantial injury with slight kill, and 9 = complete kill. The following results were obtained.

TABLE I

| Compound | Activity | | | |
|---|---|---|---|---|
| (DPD = 2,4-dinitro-1,3-phenylenediamine) | SO | VL | O | MI |
| $N^3$, $N^3$-diethyl-6-bromo-DPD | 3 | 8 | 3 | 9 |
| $N^3$, $N^3$-di-n-propyl-6-chloro-DPD | 1 | 4 | 2 | 9 |

Table I — Continued

| | SO | VL | O | MI |
|---|---|---|---|---|
| $N^1$-methyl-$N^3$, $N^3$-diethyl-6-chloro-DPD | 0 | 0 | 2 | 9 |
| $N^1$-ethyl-$N^3$, $N^3$-diethyl-6-chloro-DPD | 0 | 0 | 1 | 9 |
| $N^3$, $N^3$-di-n-propyl-6-bromo-DPD | 2 | 5 | 3 | 9 |
| $N^3$-sec-butyl-6-chloro-DPD | 2 | 3 | 1 | 9 |
| $N^1$, $N^3$-diethyl-6-bromo-DPD | 0 | 0 | 0 | 4 |
| $N^3$,$N^3$-diethyl-6-chloro-DPD | 0 | 3 | 3 | 9 |
| $N^1$, $N^3$-diethyl-6-chloro-DPD | 2 | 0 | 2 | 6 |
| $N^3$-(3-pentyl)-6-chloro-DPD | 2 | 5 | 6 | 9 |
| $N^3$, $N^3$-pentamethylene-6-chloro-DPD | 0 | 0 | 2 | 7 |
| $N^3$-(1-methyl-2-methoxyethyl)-6-1-chloro-DPD | 2 | 4 | 2 | 9 |
| $N^3$, $N^3$-di-n-propyl-6-fluoro-DPD | 2 | 5 | 8 | 9 |
| $N^3$-sec-amyl-7-bromo-DPD | 0 | 3 | 2 | 9 |
| $N^3$, $N^3$-dimethyl-6-bromo-DPD | 0 | 0 | 0 | 8 |
| $N^3$-ethyl-6-bromo-DPD | 0 | 0 | 0 | 9 |
| $N^3$-isopropyl-6-bromo-DPD | 1 | 4 | 0 | 9 |
| $N^1$-methyl-$N^3$-sec-butyl-6-chloro-DPD | 3 | 5 | 3 | 9 |

*SO = soybeans  VL = velvetleaf  O = oats  MI = millet

EXAMPLE VII $N^1$, $N^1$, $N^3$, $N^3$-tetramethyl-2,4-dinitro-6-chloro-1,3-phenylenediamine was applied as both a preemergence and postemergence treatment to corn, millet, rye grass, oats, peas, mustard, cucumbers, and snap beans. The compound was applied in an acetone-methanol solution at a rate of 25 pounds per acre. The plants were kept in a greenhouse and watered when needed. Thirty days after treatment, the plants were examined and the herbicidal activity rated on a 0 to 10 scale in which 0 = no effect and 10 = complete kill. The following results were obtained.

| Plant | Activity Rating | |
|---|---|---|
| | Pre | Post |
| Millet | 4 | 0 |
| Rye grass | 9 | 3 |
| oats | 7 | 3 |
| Peas | 0 | 0 |
| Mustard | 9 | 9 |
| Cucumber | 5 | 6 |
| Snap beans | 0 | 3 |
| Corn | 2 | 0 |

EXAMPLE VIII

The compounds to be tested were evaluated as preemergence herbicides on a broad class of representative weeds and crops. Greenhouse flats were sprayed with an ethanol solution of the compound at a rate of 0.5 pounds per acre and the chemical was mixed into the top 1-inch layer of the soil. The flats were then planted to foxtail, wild oats, millet, water grass, crabgrass, bush beans, morning glory, tomatoes, corn, rice, soybeans, cotton, barley, flax, and pigweed. The flats were kept in the greenhouse and watered when needed. Twenty-one days after planting, the plants were evaluated for herbicidal activity and rated on a 0 to 9 scale in which 0 = no effect; 5 = substantial injury with slight kill, and 9 = complete kill. The following results were obtained.

| Compound | Activity | | | | | | | | | | | | | | |
|---|---|---|---|---|---|---|---|---|---|---|---|---|---|---|---|
| | F | WO | MI | W | CB | BB | M | T | C | R | CO | B | FX | P | SO |
| $N^3$-sec-butyl-6-chloro-DPD [1] | 2 | 2 | 7 | 6 | 8 | 0 | 2 | 1 | 0 | 1 | 1 | 0 | 0 | 7 | 1 |
| $N^3$-sec-butyl-6-bromo-DPD [1] | 3 | 5 | 7 | 8 | 9 | 0 | 3 | 2 | 0 | 1 | 1 | 0 | 0 | 6 | 2 |
| $N^1$-methyl-$N^3$,$N^3$-diethyl-6-chloro-DPD [1] | 5 | 5 | 2 | 6 | 8 | 0 | 2 | 0 | 0 | 0 | 0 | 0 | 0 | 4 | 0 |
| $N^1$,$N^1$-dimethyl,$N^3$,$N^3$-diethyl-6-chloro-DPD [1] | 2 | 5 | 2 | 7 | 9 | 1 | 3 | 2 | 0 | 0 | 0 | 0 | 0 | 6 | 0 |

[1] DPD = 2,4-dinitro-1,3-phenylenediamine.

NOTE.—F=foxtail; WO=wild oats; MI=millet; W=watergrass; CB=crabgrass; BB=bush beans; M=morning glory; T=tomatoes; C=corn; R=rice; CO=cotton; B=barley; FX=flax; P=pigweed; SO=soybeans.

Since a relatively small amount of one or more of the active halo- 2,4-dinitro-1,3-phenylenediamines should be uniformly distributed over the area to be treated, the compounds preferably are formulated with conventional herbicide carriers, either liquid or solid. Thus the compounds can be impregnated on or admixed with a pulverulent solid carrier such as lime, talc, clays, Bentonite, calcium chloride, vermiculite, calcium carbonate, and the like. Alternatively, the compounds can be dissolved or suspended in a liquid carrier such as water, kerosene, alcohols, diesel oil, xylene, benzene, glycols, ketones, and the like. A surfactant preferably is included to aid in dispersion, emulsification and coverage. The surfactant can be ionic or nonionic, any may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salt of naphthalenesulfonic acid, alkylaryl polyether alcohols, long chain quaternary ammonium compounds, sodium salts of petroleum-derived alkylsulfonic acids, polyoxyethylene-sorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum o equipment and effort. Such concentrates may contain from about 5 to about 99 percent by weight of one or more of the active 6-halo-2,4-dinitro-1,3-phenylenediamines with a carrier or diluent, which may be a liquid or a solid. Liquid carriers which are miscible with the active agent or other liquids in which the compound may be suspended or dispersed can be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also, other herbicides such as the sodium borates, sodium chlorate, chlorophenoxyacetic acids, substituted uracils and ureas, triazines, benzimidazoles, carbamates, amides, and haloalkanoic acids, can be included in the formulation.

The following examples are presented to illustrate the preparation of suitable herbicidal compositions of this invention.

EXAMPLE IX 5 percent $N^3$, $N^3$-di-n-propyl-2,4-dinitrol-6-chloro-1,3-phenylenediamine (powered)

95 percent Granular clay

A granular formulation can be prepared by dry blending the above constituents until uniformly mixed in a rotary mixer. A fine spray of water is sprayed onto the mixture, while tumbling, to adhere the compound to the clay. The material is then air dried while tumbling to give a granular formulation which can be applied to the soil or vegetation by hand or by a mechanical spreader.

EXAMPLE X 85 percent $N^3$, $N^3$-diethyl-2,4-dinitro-6-bromo-1,3-phenylenediamine 14 percent Bentonite clay 1 percent Sodium lauryl sulfate surfactant A wettable powder formulation can be prepared by micronizing the 2,4-dinitro-1,3-phenylenediamine and mixing uniformly with powdered Bentonite clay and powdered sodium lauryl sulfate. The wettable powder can be added to water or hydrocarbon oil and mechanically agitated to insure a uniform dispersion which can be sprayed with conventional equipment onto soil or vegetation.

EXAMPLE XI 25 percent $N^1$-ethyl-$N^3$, $N^3$-diethyl-2,4-dinitro-6-bromo 1,3-phenylenediamine 5 percent Aromatic sulfonate-oxide condensate surfactant 70 percent Xylene The 2,4-dinitro-1,3-phenylenediamine is dissolved in xylene to form a concentrated solution. The emulsifying agent is then dissolved and a liquid formulation of an emulsifiable concentrate is obtained. The emulsifiable concentrate can be added to water to dilute it to a desired concentration, and then sprayed with conventional equipment onto soil or vegetation.

Various changes and modifications of the invention can be made and, to the extent that such variations incorporate the spirit of this invention, they are intended to be included within the scope of the appended claims.

What is claimed is:

1. A herbicidal composition comprising a herbicidally effective amount of a compound of the formula

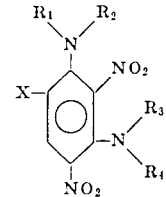

and an inert carrier therefor, in which X is halogen and $R_1$, $R_2$, $R_3$ and $R_4$ are each selected from hydrogen, lower alkyl, lower alkenyl, and lower alkynyl, at least one of said R's being a hydrocarbon group, or $R_1$–$R_2$ and/or $R_3$–$R_4$ represent a portion of a heterocyclic group having two to six carbon atoms in an alkylene chain.

2. A herbicidal composition according to claim 1 in which a surfactant is included.

3. The method for controlling weed growth which comprises applying to the locus of said weeds a phytotoxic amount of a compound of the formula

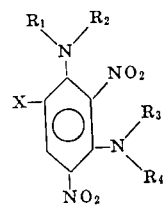

wherein X is halogen and $R_1$, $R_2$, $R_3$ and $R_4$ are each selected from hydrogen, lower alkyl, lower alkenyl, and lower alkynyl, at least one of said R's being a hydrocarbon group, or $R_1$–$R_2$ and/or $R_3$–$R_4$ represent a portion of a heterocyclic group having two to six carbon atoms in an alkylene chain.

4. The method according to claim 3 in which X is bromo or chloro, $R_1$ is hydrogen, $R_2$ is selected from hydrogen and alkyl of one to three carbon atoms and $R_3$ and $R_4$ are each selected from hydrogen and alkyl of one to five carbon atoms.

5. The method according to claim 4 in which

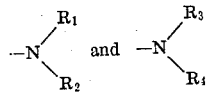

are different and $R_3+R_4$ represents a total of two to eight carbon atoms.

6. The method according to claim 3 in which X is bromo or chloro, $R_1$ and $R_2$ are hydrogen and $R_3$ and $R_4$ are hydrogen or alkyl of one to five carbon atoms with a total of three to eight carbon atoms.

7. The method according to claim 3 in which said compound is applied at a rate of 0.5 to 5 pounds per acre.

8. The method according to claim 3 in which said compound is $N^3$, $N^3$-diethyl-2,4-dinitro-6-chloro-1,3-phenylenediamine.

9. The method according to claim 3 in which said compound is $N^3$-(3 -pentyl)-2,4-dinitro-6-chloro-1,3-phenylenediamine.

10. The method according to claim 3 in which said compound is $N^3$, $N^3$-di-n-propyl-2,4-dinitro-6-chloro-1,3-phenylenediamine.

11. The method according to claim 7 in which said compound is applied as a preemergence treatment to the soil.

12. The method for controlling weed growth which comprises applying to the locus of the weeds a phytotoxic amount of a compound of the formula

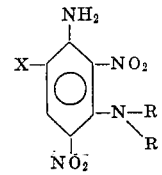

in which X is halogen and each R is selected from hydrogen and alkyl of one to five carbon atoms, the total number of carbon atoms represented by R+R being three to eight.

13. The method according to claim 12 in which X is bromo or chloro.

14. The method according to claim 12 in which said compound is applied at a rate of 0.5 to 5 pounds per acre as a preemergence treatment to the soil.

15. The method according to claim 14 in which said weed growth is in the presence of cotton.

16. The method according to claim 14 in which said weed growth is in the presence of soybeans.

Notice of Adverse Decision in Interference

In Interference No. 97,957 involving Patent No. 3,617,251, D. L. Hunter, W. G. Woods, J. D. Stone and C. W. LeFevre, HERBICIDAL HALODI-NITRO-1,3-PHENYLENEDIAMINE COMPOUNDS, final judgment adverse to the patentees was rendered Jan. 9, 1974, as to claims 2, 8 and 10.

[*Official Gazette May 21, 1974.*]

UNITED STATES PATENT OFFICE
CERTIFICATE OF CORRECTION

Patent No. 3,617,251      Dated November 2, 1971

Inventor(s) Don L. Hunter, et al.

It is certified that error appears in the above-identified patent and that said Letters Patent are hereby corrected as shown below:

In Column 1, line 7, the word "six" should read --6--;

line 22, that portion of the sentence appearing as "$R_1,R_2R_3$" should read --$R_1$, $R_2$, $R_3$--;

line 32, the word "two" should read --2--;

line 33, the word "four" should read --4--;

line 34, the word "six" should read --6--;

line 57, the figure "7" should read --Z--.

In Column 2, lines 3 and 4, the compound "$N^1$-ethyl-$N^3$-sec-butyl-2,4-dinitro-6-bromo 1,3-phenylenediamine" should read --$N^1$-ethyl-$N^3$-sec-butyl-2,4-dinitro-6-bromo-1,3-phenylenediamine--;

lines 5 and 6, the compound "$N^1$-methyl-$N^3$, $N^3$-di-n-propyl-2,4-dinitro-6-chloro-1,3-phenylenediamine" should read --$N^1$-methyl-$N^3$,$N^3$-di-n-propyl-2,4-dinitro-6-chloro-1,3-phenylenediamine--;

line 34, the compound "1,24-trihalo3,5-dinitrobenzene" should read --1,2,4-trihalo-3,5-dinitrobenzene-- .

UNITED STATES PATENT OFFICE
CERTIFICATE OF CORRECTION

Patent No. 3,617,251                  Dated    November 2, 1971

Inventor(s) Don L. Hunter, et al.

It is certified that error appears in the above-identified patent and that said Letters Patent are hereby corrected as shown below:

In Column 3, line 27, the word "to" should read --at--;

line 28, the word "ten" should read --then--;

line 49, the numbers and words appearing as "(40 percent)" should read --(40.3 percent)--;

line 52, the numbers should read --119.3°-120.6°--;

line 53 should read --C.--;

line 72, the compound "N,N,N-di-n-propyl-3-chloro-2,6-dinitro-4-fluoroaniline" should read --N,N-di-n-propyl-3-chloro-2,6-dinitro-4-fluoroaniline--.

In Column 4, line 2, the compound "di-n-hydrochloride" should read --di-n-propylamine hydrochloride--;

line 6, that portion of the compound "N,N-di-n-propyl-3-chloro   -2,6-dinitro-4-" should read --N,N-di-n-propyl-3-chloro-2,6-dinitro-4-;

lines 12 and 13, the compound "N,N-di-n-propyl3-chloro2,6-dinitro-4-fluoroaniline" should read --N,N-di-n-propyl-3-chloro-2,6-dinitro-4-fluoroaniline--;

UNITED STATES PATENT OFFICE
CERTIFICATE OF CORRECTION

Patent No. 3,617,251  Dated November 2, 1971

Inventor(s) Don L. Hunter, et al

It is certified that error appears in the above-identified patent and that said Letters Patent are hereby corrected as shown below:

In Column 4, line 14, before the numbers "6.06" should appear the word --a--;

line 49, the compound "$N^3$-sec-butyl-2,4-dinitro-5-chloro-1,3-phenylenediamine" should read --$N^3$-sec-butyl-2,4-dinitro-6-chloro-1,3-phenylenediamine--;

line 51, the compound "$N^3$sec-butyl-2,4-dinitro-6-bromo-1,3-phenylenediamine" should read --$N^3$-sec-butyl-2,4-dinitro-6-bromo-1,3-phenylenediamine--;

lines 55 and 56, the compound "$N^3$(1-methyl-2-methoxyethyl)-2,4-dinitro-6-chloro-1,3-phenylenediamine 148°-150°C." should be deleted and the following compound should be inserted --$N^3$-isopropyl-2,4-dinitro-6-bromo-1,3-phenylenediamine; 148°-150°C.--;

line 62, that portion of the compound "$N^1$, $N^3$-bis(2-chloroallyl)-2,4-dinitro-6-chloro-1,3-phen-" should read --$N^1,N^3$-bis(2-chloroallyl)-2,4-dinitro-6-chloro-1,3-phen- --;

line 64, that portion of the compound "$N^1$, $N^3$-dicyclopropyl-2,4-dinitro-6-chloro-1,3-phen-" should read --$N^1,N^3$-dicyclopropyl-2,4-dinitro-6-chloro-1,3-phen- --;

UNITED STATES PATENT OFFICE
CERTIFICATE OF CORRECTION

Patent No. 3,617,251    Dated November 2, 1971

Inventor(s) Don L. Hunter, et al.

It is certified that error appears in the above-identified patent and that said Letters Patent are hereby corrected as shown below:

In Column 4, line 66, the compound "$N^1$, $N^3$-diallyl-2,4-dinitro-6-bromo-1,3-phenylenediamine" should read --$N^1,N^3$-diallyl-2,4-dinitro-6-bromo-1,3-phenylenediamine--;

line 68, that portion of the compound "$N^1$, $N^1$-dimethyl-$N^3$, $N^3$-diethyl-2,4-dinitro-6-chloro-1,3-" should read --$N^1,N^1$-dimethyl-$N^3,N^3$-diethyl-2,4-dinitro-6-chloro-1,3- --;

line 72, that portion of the compound "$N^3$, $N^3$-pentamethylene-2,4-dinitro-6-chloro-1,3-phen" should read --$N^3,N^3$-pentamethylene-2,4-dinitro-6-chloro-1,3-phen- --;

line 74, that portion of the compound "$N^1,N^1,N^3,N^3$-tetra-n-propyl-2,4-chloro-6-fluoro-1,3-phen-" should read --$N^1,N^1,N^3,N^3$-tetra-n-propyl-2,4-dinitro-6-fluoro-1,3-phen- --.

In Column 5, line 1, that portion of the compound "$N^1$-methyl-$N^3$-sec-butyl-2,4-dinitro-6-chlroo-1,3-phen-" should read --$N^1$-methyl-$N^3$-sec-butyl-2,4-dinitro-6-chloro-1,3-phen- --;

UNITED STATES PATENT OFFICE
CERTIFICATE OF CORRECTION

Patent No. 3,617,251                 Dated November 2, 1971

Inventor(s) Don L. Hunter, et al.

It is certified that error appears in the above-identified patent and that said Letters Patent are hereby corrected as shown below:

In Column 5, line 3, that portion of the compound "$N^3$, $N^3$-di-n-propyl-2,4-dinitro-6-chloro-1,3-phen-" should read --$N^3$,$N^3$-di-n-propyl-2,4-dinitro-6-chloro-1,3-phen- --;

line 7, the compound "$N^1$, $N^3$-diethyl-2,4-dinitro-6-fluoro-1,3-phenylenediamine" should read --$N^1$,$N^3$-diethyl-2,4-dinitro-6-fluoro-1,3-phenylenediamine--;

line 9, that portion of the compound "$N^1$-methyl-$N^3$, $N^3$-di-n-propyl-2,4-dinitro-6-chloro-1,3-" should read --$N^1$-methyl-$N^3$,$N^3$-di-n-propyl-2,4-dinitro-6-chloro-1,3- --;

line 11, that portion of the compound "$N^1$-methyl-$N^3$, $N^3$-diethyl-2,4-dinitro-6-chloro-1,3-phen-" should read --$N^1$-methyl-$N^3$,$N^3$-diethyl-2,4-dinitro-6-chloro-1,3-phen- --;

line 13, that portion of the compound "$N^3$, $N^3$-dimethyl-2,4-dinitro-6-bromo-1,3-phen-" should read --$N^3$,$N^3$-dimethyl-2,4-dinitro-6-bromo-1,3-phen- --;

UNITED STATES PATENT OFFICE
CERTIFICATE OF CORRECTION

Patent No. 3,617,251          Dated November 2, 1971

Inventor(s) Don L. Hunter, et al.

It is certified that error appears in the above-identified patent and that said Letters Patent are hereby corrected as shown below:

In Column 5, line 15, that portion of the compound "$N^1$, $N^3$-dicyclohexyl-2,4-dinitro-6-bromo-1,3-phen-" should read --$N^1$,$N^3$-dicyclohexyl-2,4-dinitro-6-bromo-1,3-phen- --;

line 28, the word "phytotoxid" should read --phytotoxic--;

line 58, after the word "Activity" should appear the symbol --*--.

In Column 6, line 4, the compound "$N^1$-ethyl-$N^3$,$N^3$-diethyl-chloro-DPD" should read --$N^1$-ethyl-$N^3$,$N^3$-diethyl-6-chloro-DPD--;

line 11, that portion of the compound "$N^3$-(1-methyl-2-methoxyethyl)-6-1" should read --$N^3$-(1-methyl-2-methoxyethyl)-6- --;

line 14, the compound "$N^3$-sec-amyl-7-bromo-DPD" should read --$N^3$-sec-amyl-6-bromo-DPD--.

In Column 7, line 15, the word "any" should read --and--;

UNITED STATES PATENT OFFICE
CERTIFICATE OF CORRECTION

Patent No. 3,617,251          Dated November 2, 1971

Inventor(s) Don L. Hunter, et al.

It is certified that error appears in the above-identified patent and that said Letters Patent are hereby corrected as shown below:

In Column 7, line 42, the letter "o" should be deleted and the word --of-- should be inserted;

line 67, that portion of the compound "$N^3,N^3$-di-n-propyl-2,4-dinitrol-6-chloro-1,3-" should read --$N^3,N^3$-di-n-propyl-2,4-dinitro-6-chloro-1,3- --.

In Column 9, line 19, that portion of the compound "$N^3$, $N^3$-diethyl-2,4-dinitro-6-chloro-1,3-phen-" should read --$N^3,N^3$-diethyl-2,4-dinitro-6-chloro-1,3-phen- --;

line 22, that portion of the compound "$N^3$-(3 -pentyl)-2,4-dinitro-6-chloro-1,3-phen-" should read --$N^3$-(3-pentyl)-2,4-dinitro-6-chloro-1,3-phen- --.

Signed and sealed this 17th day of December 1974.

(SEAL)
Attest:

McCOY M. GIBSON JR.           C. MARSHALL DANN
Attesting Officer          Commissioner of Patents